United States Patent
Hüllenkremer et al.

(10) Patent No.: US 9,890,541 B2
(45) Date of Patent: Feb. 13, 2018

(54) FLOOR BOARD, IN PARTICULAR FOR FLOORING

(71) Applicant: HÜMA PARKETTSYSTEM GmbH, Eberswalde (DE)

(72) Inventors: Felix Hüllenkremer, Braunschweig (DE); Manuel Mannheim, Westhausen (DE)

(73) Assignee: HÜMA PARKETTSYSTEM GMBH, Eberswalde (DE)

( * ) Notice: Subject to any disclaimer, the term of this patent is extended or adjusted under 35 U.S.C. 154(b) by 0 days.

(21) Appl. No.: 14/786,171

(22) PCT Filed: Apr. 24, 2014

(86) PCT No.: PCT/EP2014/058411
§ 371 (c)(1),
(2) Date: Oct. 22, 2015

(87) PCT Pub. No.: WO2014/174056
PCT Pub. Date: Oct. 30, 2014

(65) Prior Publication Data
US 2016/0069086 A1    Mar. 10, 2016

(30) Foreign Application Priority Data

Apr. 24, 2013 (DE) .................. 10 2013 007 048

(51) Int. Cl.
*E04F 15/04* (2006.01)
*E04F 15/02* (2006.01)
*B29C 70/76* (2006.01)

(52) U.S. Cl.
CPC ........ *E04F 15/02038* (2013.01); *B29C 70/76* (2013.01); *E04F 15/02011* (2013.01);
(Continued)

(58) Field of Classification Search
CPC .......... E04F 15/02038; E04F 15/02016; E04F 15/02011; E04F 2201/041;
(Continued)

(56) References Cited

U.S. PATENT DOCUMENTS 3,694,983 A * 10/1972 Couquet ................. B29C 70/78
404/40
3,859,000 A * 1/1975 Webster .................. B63B 35/34
14/27
(Continued)

FOREIGN PATENT DOCUMENTS

CN    101460688 A    6/2009
CN    101622409 A    1/2010
(Continued)

*Primary Examiner* — Christine T Cajilig
(74) *Attorney, Agent, or Firm* — Soroker Agmon Nordman

(57) ABSTRACT

The invention relates to a floor board having connection geometries corresponding to each other and made of plastics, wherein the first connection geometry is provided along two abutting side surfaces and has a groove which is open toward the bottom and is bordered by a lip toward the outside, and the groove has an undercut along its walls. The second connection geometry is provided along the abutting side surfaces and has a groove which is open toward the top and is bordered by a lip toward the outside, and the groove has an undercut along its walls. The lip of the first connection geometry and the lip of the second connection geometry each have at least one slot at least in sections. The invention also relates to a floor board having a connecting element that is made of a multi-component material.

14 Claims, 8 Drawing Sheets

Figure 1:
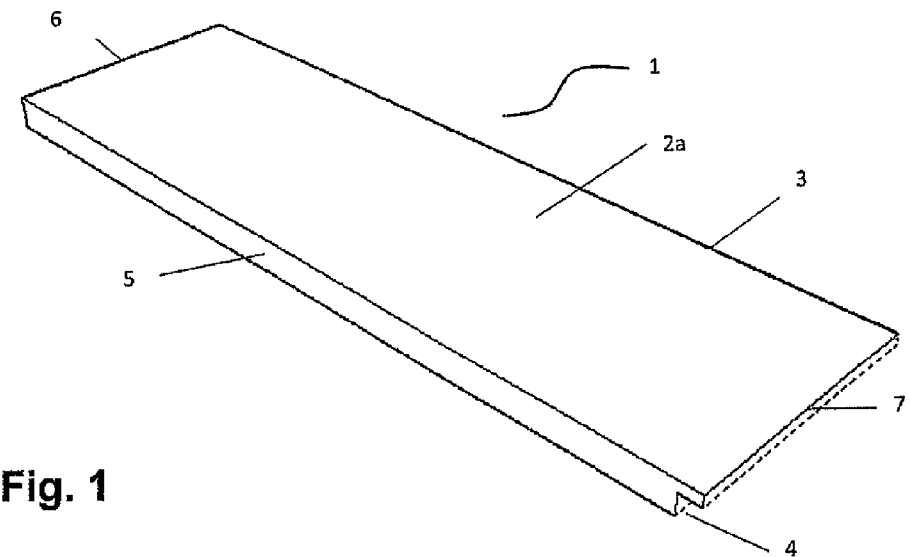

(52) U.S. Cl.
CPC .............. *E04F 15/02016* (2013.01); *E04F 2201/0146* (2013.01); *E04F 2201/041* (2013.01); *E04F 2201/044* (2013.01); *E04F 2201/049* (2013.01)

(58) Field of Classification Search
CPC .......... E04F 2201/044; E04F 2201/048; E04F 2201/049; E04F 2201/0146
See application file for complete search history.

(56) References Cited

U.S. PATENT DOCUMENTS

| | | | | |
|---|---|---|---|---|
| 7,655,290 B2* | 2/2010 | Verrue | ............... | A47G 27/0293 428/60 |
| 7,984,600 B2* | 7/2011 | Alford | ................... | E04F 13/14 52/385 |
| 8,037,657 B2* | 10/2011 | Sjoberg | .................. | E04F 15/02 156/304.5 |
| 8,640,418 B2* | 2/2014 | Paetrow | ............. | E04F 13/0889 52/582.1 |
| 8,806,832 B2* | 8/2014 | Kell | ................. | E04F 15/02033 52/578 |
| 2007/0220822 A1* | 9/2007 | Permesang | ............. | E04F 13/08 52/392 |
| 2008/0241440 A1* | 10/2008 | Bauer | .................... | E04F 15/02 428/33 |
| 2009/0193741 A1* | 8/2009 | Cappelle | ................. | E04F 15/02 52/309.1 |
| 2010/0031594 A1* | 2/2010 | Liu | ......................... | E04F 15/02 52/403.1 |
| 2013/0036695 A1* | 2/2013 | Durnberger | ....... | E04F 15/02038 52/309.3 |
| 2013/0192158 A1* | 8/2013 | Cappelle | .................. | B32B 7/02 52/588.1 |
| 2014/0093677 A1* | 4/2014 | Permesang | ....... | E04F 15/02038 428/99 |

FOREIGN PATENT DOCUMENTS

| | | |
|---|---|---|
| CN | 102119253 A | 7/2011 |
| DE | 2139283 | 2/1972 |
| DE | 10225579 | 12/2003 |
| DE | 20122763 | 8/2007 |
| DE | 202007018935 | 10/2009 |
| DE | 102011078160 | 1/2013 |
| EP | 1584770 | 10/2005 |
| WO | 2008004960 | 1/2008 |
| WO | 20120126046 | 9/2012 |

* cited by examiner

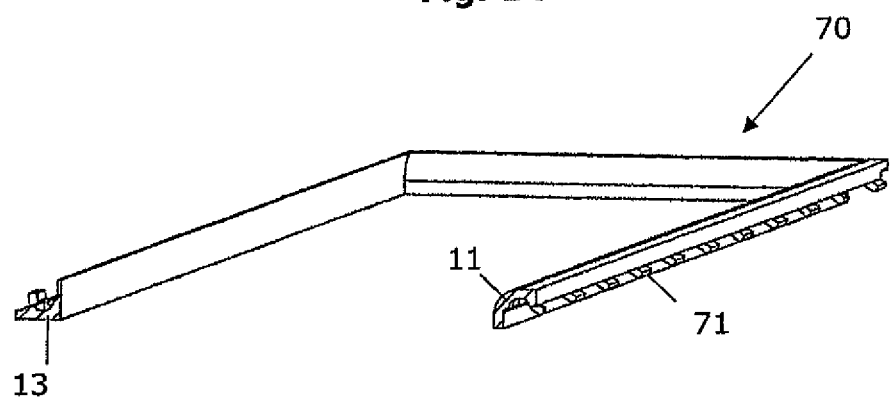
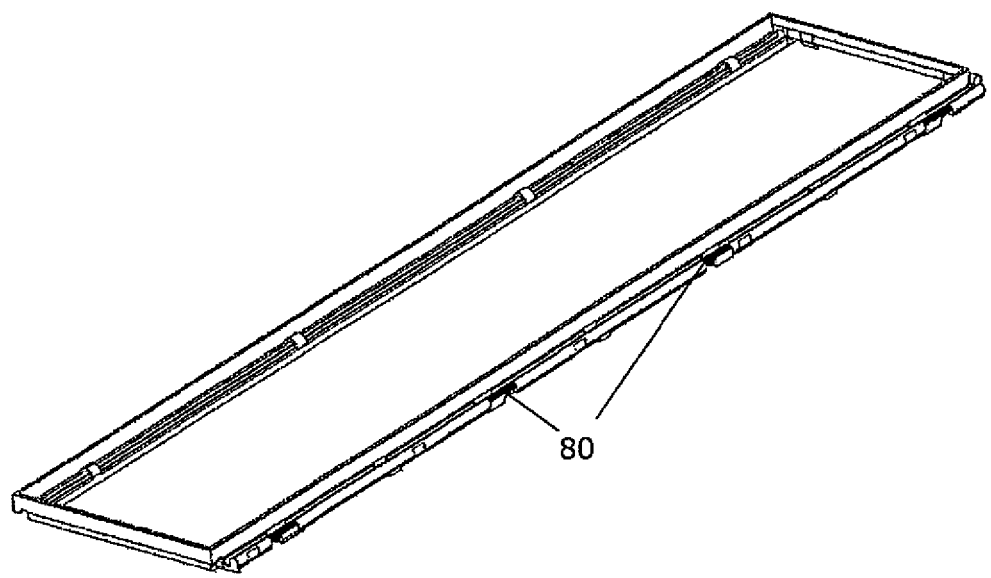

FLOOR BOARD, IN PARTICULAR FOR FLOORING

RELATED APPLICATIONS

The present application claims priority as a US national phase under 35 U.S.C. 363 of PCT/EP2014/058411 filed on Apr. 24, 2014, the disclosure of which is incorporated herein by reference.

The present invention relates to floor boards, in particular floorings, having connection geometries corresponding to each other on respectively opposite-lying sides for connection with neighboring boards as well as floor boards having a high impermeability in the area of the joints. In particular, the present invention relates to such floor boards with which floorings made of wood-based material and wood composites can be formed in wet or moist environments.

Floorings should not only be robust and easy to clean but should also meet decorative needs. Natural materials such as wood are the ideal material for meeting this requirements profile. They combine a high degree of functionality with the comfortable feeling of a living material.

However, due to its biogenic, organic structure, here are natural limits for the range of use of wood. As an open-porous material with high capillary forces, wood is markedly hygroscopic and adsorbs water, which not only leads to deformation but also promotes microbial and enzymatic decomposition. The use of wood floorings in moist and wet areas is thus extremely problematic and afflicted with an enormous risk of only insufficiently meeting the technical requirements profile. Despite its aesthetics, wood floorings in moist areas thus represent an expensive niche product with a high level of care required.

Wood-based floor boards with connection profiles running along the edge for the connection of boards are generally known but are not generally used in moist or wet environments for the reasons named above. While it is also known to make the surfaces water-repellent through corresponding treatment, the joint sealing on the abutting edges of neighboring boards does present a problem. Water can get in here, which then penetrates inside the board and makes the wood material swell up.

DE 20 2007 018 935 U1 describes a floor board for the formation of a flooring, wherein the connection takes place according to the tongue and groove principle. The board has a ledge-like upper projection on one side surface and a lower ledge-like projection on the opposite-lying side surface. A depression open toward the top as well as a recess guided horizontally or diagonally toward the top, which protrudes into the inside of the board, is located in the lower ledge-like projection. A contour protruding downwards, which comes to rest during the joining in the depression of a board to be installed, is correspondingly located on the bottom side of the upper ledge-like projection. Further, the connection profile has a projection protruding over the lateral board edge, which is pushed into the recess of the neighboring board during the joining. It is suggested to attach the connection profiles made up of the depression and recess on one side and the downwards protruding contour and projection protruding over the lateral edge of the board on the other side or at least parts of it made of a plastic material to the base plate by means of injection molding or co-extrusion. A special sealing of the abutting edges is not provided. Moreover, the contours of the connection profile in some areas are not shaped complementarily and/or precisely with respect to each other, so that there are gaps there in the joined state and the connection profiles do not rest against each other in a form-fitting manner. With these connection profiles with horizontally aligned connecting elements, the installation of a board against a first board is only possible diagonally from top to bottom by means of a pivoting movement. If the boards are then already adjoined on one side, normally the longitudinal side, the adjoining on the short sides is made difficult since the diagonal movement can no longer be readily executed. The boards can be made of a wood-based material or solid wood. No information is provided regarding its use in a wet area or for its suitability for this.

Floor boards with mainly vertically aligned connecting elements are described in DE 100 01 076 C1. These floor boards have edge profiles, in which undercuts engage with each other. A tongue element protrudes below an upper ledge downwards perpendicularly and has a mainly circular cross-section. A groove element on the top side of a lower ledge is provided as the counterpiece. It also has a circular cross-section and is open towards the top. Both the groove element and the tongue element have bent undercuts corresponding to each other. The engagement of groove and tongue during installation is described as a lowering movement, but in actuality the movement of the lowered board is, strictly speaking, a pivoting movement. The ledges with groove or respectively tongue element are formed from the base plate and are made of the same material as the base plate. No information is provided regarding suitability for wet or moist environments.

It was a concern of the present invention to provide a wood-based floor board, which is also suitable in particular for wet or moist environments, which has a high impermeability in the area of the joints, and/or permits a simple and secure installation and which is easy to produce in an economical manner.

The floor board according to the invention is formed from a rectangular base plate, which has a top side, bottom side and at least four side surfaces. The base plate is made of a wood-based material.

According to a first aspect of the invention, the floor board has a top side, a bottom side and at least four side surfaces, wherein respectively two opposite-lying side surfaces have connection geometries corresponding to each other made of plastic and wherein the floor board consists of a base plate, and the first connection geometry is provided along two abutting side surfaces and has a groove which is open toward the bottom and is bordered by a lip toward the outside, and the groove has an undercut along its walls. The second connection geometry is provided along the abutting side surfaces and has a groove which is open toward the top and is bordered by a lip toward the outside, and the groove has an undercut along its walls, wherein the shape and dimension of the first connection geometry is complementary to the shape and dimension of the second connection geometry, wherein the lip of the first connection geometry and the lip of the second connection geometry each have at least one slot at least in sections.

The connection geometries respectively arranged on two opposite-lying side surfaces and corresponding to each other are designed for adjoining and connecting with neighboring floor boards. Furthermore, the connection geometries corresponding to each other are designed such that they snap the first connection geometry of the first floor board with the second connection geometry of the second floor board during connection of two floor boards according to the invention.

The slots in the lips of the first and second connection geometries enable an easier joining in their respective corresponding connection geometry. During passage through the narrowest point of the respective corresponding connection geometry, the diameter of the lip is reduced by the slot. The lip is compressed. The lip is unloaded again at the deepest point and snaps into its corresponding geometry.

In one embodiment, the lip of the first connection geometry and the lip of the second connection geometry each have a sequence of slots, which are separated from each other by means of a web, wherein in particular the web has a thickness, measured along the longitudinal extension direction of the lip, of 2 mm to 50 mm.

The number of webs (and thus the "length" of the slot) and the thickness of the webs are thereby selected depending on the requirements of the connection geometries (also depending on the material of the connection geometries). For example, a large number of webs with a large thickness effectuates an increased rigidity of the connection geometries. The webs are preferably arranged equidistant and the thicknesses of the webs are also the same. Alternatively, the webs can also have different thicknesses and/or be arranged at different separation distances.

An average reinforcement of the connection geometry is achieved when the ratio of webs to slots is equal. By reducing the number of webs and increasing the number of slots, the joining of the floor board is facilitated while the rigidity is reduced. The form-fit and frictional connection is reduced. In contrast, the joining of the elements is facilitated. Conversely, this means that by increasing the number of webs and reducing the number of slots, the form-fit and frictional connection is increased and the joining is made difficult. As a result, the thickness and the number of webs are material-dependent. Harder plastics require less or respectively thinner webs, softer plastics consequently more or respectively thicker webs.

In one embodiment, the floor board according to the invention has two abutting side surfaces of the base plate on the top side having a first protruding ledge and the two opposite-lying side surfaces a second protruding ledge, wherein the first connection geometry is arranged on the bottom side of the first ledges and the second connection geometry is arranged on the bottom side of the second ledges.

The floor board according to the invention thus has a top side, a bottom side and at least four side surfaces, wherein respectively two opposite-lying side surfaces have connection geometries corresponding to each other made of plastic and wherein the floor board consist of a base plate, and two abutting side surfaces of the base plate on the top side have a first protruding ledge and the two opposite-lying side surfaces have a second protruding ledge, wherein the first connection geometry is arranged on the bottom side of the first ledges and the second connection geometry is arranged on the bottom side of the second ledges, wherein the first connection geometry has a groove which is open toward the bottom, which is bordered by a lip toward the outside, and the groove has an undercut along its walls, and the second connection geometry has a groove open toward the top, which is bordered toward the outside by a lip, and the groove has an undercut along its walls, wherein the shape and dimension of the first connection geometry are complementary to the shape and dimension of the second connection geometry, wherein the lip of the first connection geometry and the lip of the second connection geometry each have at least one slot at least in sections.

The top area of the base plate thus protrudes on two abutting side surfaces over the bottom area and forms respectively a first protruding ledge, which progresses along the two side surfaces. Furthermore, on the other two abutting side surfaces, the top area of the base plate (to a smaller degree) protrudes over the bottom area and forms respectively a second protruding ledge, which progresses along both side surfaces.

The side surfaces of the first and second ledges are thereby not surrounded by the connection geometry. The connection geometries extend below the respective ledges along the base plate. The dimensions of the connection geometries and of the first and second ledges are thereby selected such that, in the case of a connection of two floor boards, the top area of the base plate (the side surfaces of the first and second ledges) lies opposite itself without substantial hollow spaces forming between these sides surfaces of the top area. In particular, the floor boards can be placed against each other without gaps.

In one embodiment, the floor board has a protruding ledge on two abutting side surfaces of the base plate on the top side, wherein the two opposite-lying side surfaces are planar, and wherein a first connection geometry is arranged on the bottom side of the ledges, and the second connection geometry is arranged along the bottom edge of the planar side surfaces.

The floor board according to the invention thus has a top side, a bottom side and at least four side surfaces, wherein respectively two opposite-lying side surfaces have connection geometries made of plastic corresponding to each other, wherein the floor board consists of a base plate, and two abutting side surfaces of the base plate on the top side have a protruding first ledge, and wherein the two opposite-lying side surfaces are planar, and wherein a first connection geometry is arranged on the bottom side of the first ledges, and the second connection geometry is arranged along the bottom edge of the planar side surfaces, and wherein a sealing lip with the connection geometries made of plastic is applied along the side surfaces, and the first connection geometry has a groove open toward the bottom, which is bordered by a lip toward the outside, and the groove has an undercut along its walls, and the second connection geometry has a groove open toward the top, which is bordered by a lip toward the outside, and the groove has an undercut along its walls, wherein the shape and dimension of the first connection geometry are complementary to the shape and dimension of the second connection geometry, wherein the lip of the first connection geometry and the lip of the second connection geometry each have at least one slot at least in sections.

The top area of the base plate thus protrudes on two abutting side surfaces over the bottom area and forms a first protruding ledge, which progresses along the two side surfaces. The side surfaces which lie opposite the side surfaces with the protruding ledge are planar, thus having no protruding ledge. The first connection geometry is thereby located on the bottom side of the protruding ledges and the second connection geometry extends along the two other planar side surfaces, in particular along the bottom edge area.

The sealing lip thereby extends along the side surfaces which are formed by the first ledges of the base plate and along the top edge area of the two other planar side surfaces. The connection geometries extend below the respective ledges along the base plate and along the bottom edge area of the two other planar side surfaces and are arranged on the sealing lip and connected with it. The dimensions of the connection geometries and the first ledges are thus selected so that when two floor plates are connected the sealing lips of the respective floor boards lie opposite each other without substantial hollow spaces forming between these sides surfaces of the top area. In particular, the floor boards can be placed against each other without gaps.

In one embodiment, the protruding first ledge, which is provided on two abutting side surfaces of the base plate, typically has a strength which corresponds to 30-40%, preferably 33 to 37% and particularly preferably 35-36% of the height of the base plate or respectively floor board.

The length of the first ledge, i.e. the distance between the front surface of the first ledge and the side surface, is preferably mainly equal to the distance between the bottom side of the ledge and the bottom edge of the side surface; the length of the first ledge is in particular 8 mm to 15 mm, preferably 11 mm to 12 mm.

In one embodiment, the protruding second ledge, which is provided on two abutting side surfaces of the base plate, typically has a strength which corresponds to 30-40%, preferably 33 to 37% and particularly preferably 35-36% of the height of the base plate or respectively floor board.

The length of the second ledge, i.e. the distance between the front surface of the second ledge and the side surface, is preferably mainly equal to the distance between the bottom side of the ledge and the bottom edge of the side surface; the length of the first ledge is in particular 1 mm to 5 mm, preferably 2 mm to 3 mm.

The ledge makes it possible to position the connection geometry applied there so that the connecting element on this side lies exactly above the corresponding connection geometry of the other side. Furthermore, the purely vertical joining of the floor boards is thereby first enabled.

The first and second connection geometries are designed complementarily to each other, wherein the first and second connection geometries are formed respectively from a groove which is open toward the bottom and a lip which borders the groove toward the outside, and wherein the inner walls of the grove have an undercut. The free end of the lip can thereby mainly have any shape which allows an undercut due to its geometry.

In one embodiment, the inner walls of the groove of the first and/or second geometry have a bent undercut, wherein the free end of the respective lip has a roundish shape.

In one embodiment, the lip of the first connection geometry is shaped precisely for the inner contour of the groove of the second connection geometry which is open toward the top, and the lip of the second connection geometry is shaped precisely for the inner contour of the groove of the first connection geometry which is open toward the bottom.

In one embodiment, the groove of the first connection geometry which is open toward the bottom has an arched cross-section, and the lip of the first connection geometry has a rounded free end, which ends in a level surface on the outer walls with an inner curvature and merges into the sealing lip.

The dimensions and contours of the grooves and lips are selected in the above embodiments such that, in the case of the adjoining of two floor boards according to the invention, the lip of the first connection geometry of a floor board according to the invention can be pushed in vertically from above into the groove of the second connection geometry of the other floor board according to the invention (and vice versa) and snap in place. The inner contours of the groove of a connection geometry and the outer contour of the lip of the other connection geometry correspond with each other in shape like a positive and negative image.

In one embodiment, the dimensions are precise so that a form-fit and frictional connection is formed, wherein the contours lie against each other and mainly no hollow spaces are formed between the groove and lip in the joined state.

In one embodiment, breaks in the connection geometry, in particular the lip, are provided at the corner areas of the floor board where two side surfaces abut, preferably at least on one side surface so that, during connection of the floor boards, there is no overlap between the connection geometries of abutting side surfaces, like narrow and longitudinal sides. For this, the breaks in the direction of the one side, for example a narrow side, spring back at least so far as the radius of the lip of the abutting side, for example longitudinal side, protrudes so that no overlap occurs during connection. These breaks can be sections without a connection geometry, in particular without a lip, and thus facilitate a joining of neighboring or adjacent floor boards to these side surfaces. With the help of breaks, floor boards can be joined both longitudinally as well as laterally to a first floor board. Different laying patterns thus result. Further, the breaks enable at least in one direction a lying against each other of the floor boards offset in any manner. The installation of the floor boards is not bound to a defined pattern.

In the above embodiments, the connection geometries and (if present) the sealing lip are made of plastic. They can be applied advantageously to a prefabricated base plate in a cycle by means of injection molding technology. Through the use of injection molding technology, a continuous production in series production is possible and the boards are delivered ready to install. As a result, joint sealing with integrated connection geometry is achieved.

The sealing lip and the connection geometries can be made of the same plastic material. Alternatively, the sealing lip and/or the connection geometries can be made of a multi-component material (different plastics).

In one embodiment, the sealing lip and the connection geometries are made of one piece of a plastic material.

In one embodiment, the sealing lip and the connection geometries are made of one piece of a plastic material, which has a Shore hardness A of at least 60, in particular a Shore hardness A of 60 to 90, preferably of 75 to 85.

In one embodiment, the sealing lip and the connection geometries are made of one piece of plastic material, which has a Shore hardness A of 80 to 90.

The material is thereby selected such that the soft plastic is sufficiently elastoplastic so that the material is sealed in the case of occurring pressure. Furthermore, the material should have a sufficient hardness in order to ensure a stable connection of the floor boards.

In one embodiment, the sealing lip and the connection geometries are made of one piece of thermoplastic.

In one embodiment, the sealing lip and the connection geometries are made of one piece of a thermoplastic elastomer.

Through the one-piece design of the sealing lip and of the connection geometries, an increased productivity is enabled at low investment costs since this it is easier to implement from a technical process point of view.

In one embodiment, the sealing lip is made of a soft plastic and the connection geometries are made of a hard plastic.

In one embodiment, the sealing lip is made of a thermoplastic elastomer, in particular with a Shore hardness A of 30 to 85, and the connection geometries are made of a thermoplastic.

In one embodiment, the sealing lip is made of a soft thermoplastic elastomer, in particular with a Shore hardness A of 30 to 60, and the connection geometries are made of a hard thermoplastic elastomer, in particular with a Shore hardness A of more than 85 to a Shore hardness D of 75.

In one embodiment, the sealing lip is made of a soft thermoplastic elastomer, in particular with a Shore hardness A of 60 to 85, preferably with a Shore hardness A of 60 to 80, and the connection geometries are made of a hard thermoplastic elastomer, in particular with a Shore hardness A of more than 85 to a Shore hardness D of 75.

In one embodiment, the floor board, in particular for floorings, has a top side, a bottom side and at least four side surfaces, wherein respectively two opposite-lying side surfaces have connection geometries corresponding to each other for joining and connecting with neighboring floor boards, wherein the floor board consists of a base plate, wherein two abutting side surfaces of the base place have a protruding ledge on the top side and the two opposite-lying side surfaces are planar, wherein a sealing lip with connection geometries made of plastic is applied along the side surfaces, wherein a first connection geometry is arranged on the bottom side of the ledges and has a groove which is open toward the bottom along the side surfaces, which is bordered by a lip, and the groove along its wall has an undercut, wherein the second connection geometry is arranged along the bottom edge of the planar side surfaces, and has a groove which is open toward the top, which is bordered by a lip toward the outside, and the groove has an undercut along its wall, wherein the shape and dimension of the first connection geometry are complementary to the shape and dimension of the second connection geometry, and the first connection geometry of the first floor board snaps together with the second connection geometry of the second floor board during the connection of two floor boards.

The floor board according to the invention is formed from a rectangular base plate, which has a top side, bottom side and at least four side surfaces. The base plate is made of a wood-based material. A circumferential sealing lip made of plastic is provided along the side surfaces of the base plate. Moreover, on respectively two abutting side surfaces on the sealing lips and connected with them and the base plate, a first or respectively second connection geometry is designed, which permit an adjoining of the floor boards according to the key lock principle with snap connection. The first and second connection geometries are also made of a plastic.

With the connection geometries according to the invention, the adjoining of individual boards is possible through a vertical downwards movement; a pivoting is not required. Thus, a similarly simple and uncomplicated adjoining and immobilization of a floor board to be installed adjacently can be performed on all sides of a board.

The top area of the base plate thus protrudes on two abutting side surfaces over the bottom area and forms respectively a first protruding ledge, which progresses along the two side surfaces. The side surfaces, which lie opposite the side surfaces with the protruding ledge, are planar, thus having no protruding ledge. The first connection geometry is located on the bottom side of the protruding ledges and the second connection geometry extends along the bottom edge area of the two other planar side surfaces.

The first connection geometry is formed from a groove open toward the bottom and a lip which borders the groove toward the outside, wherein the inner walls of the groove have a bent undercut, and the free end of the lip has a roundish shape, wherein the outer surface of the lip merges into the sealing lip. The second connection geometry is formed from a groove open toward the top, which also has an undercut on the inner walls and is bordered by a lip toward the outside, the free end of which is shaped in a roundish manner. The dimensions and contours of the grooves and lips are selected such that, in the case of the adjoining of two boards, the lip of the first connection geometry of a board can be pushed and snapped vertically from above into the groove of the second connection geometry of the other board and vice versa.

In one embodiment, the lip of the first connection geometry is shaped precisely for the inner contour of the groove of the second connection geometry which is open toward the top, and the lip of the second connection geometry is shaped precisely for the inner contour of the groove of the first connection geometry which is open toward the bottom. In one embodiment, the groove of the first connection geometry which is open toward the bottom has an arched cross-section, and the lip of the first connection geometry has a rounded free end, which ends in a level surface on the outer walls with an inner curvature and merges into the sealing lip.

The inner contours of the groove of a connection geometry and the outer contour of the lip of the other connection geometry correspond with each other in shape like a positive and negative image. The dimensions are preferably precise so that a form-fit and frictional connection is formed, wherein the contours lie against each other and mainly no hollow spaces are formed between the groove and lip in the joined state. Through the connection concept according to the invention, adjoined floor boards are locked together permanently on one hand so that an accidental separation is prevented. On the other hand, they can be separated from each other as needed without being destroyed through the appropriate application of force.

The protruding ledge which is provided on two abutting side surfaces of the base plate typically has a strength which corresponds to 30-40%, preferably 33 to 37% and particularly preferably 35-36% of the height of the base plate or respectively floor board. The length of the ledge, i.e. the distance between the front surface of the ledge and the side surface, is preferably mainly equal to the distance between the bottom side of the ledge and the bottom edge of the side surface.

Breaks in the connection geometry, in particular the lip, are provided at the corner areas of the floor board where two side surfaces abut, preferably at least on one side surface so that, during connection of the floor boards, there is no overlap between the connection geometries of abutting side surfaces, like narrow and longitudinal sides. For this, the breaks in the direction of the one side, for example a narrow side, spring back at least so far as the radius of the lip of the abutting side, for example longitudinal side, protrudes so that no overlap occurs during connection. These breaks can be sections without a connection geometry, in particular without a lip, and thus facilitate a joining of neighboring or adjacent floor boards to these side surfaces. With the help of breaks, floor boards can be joined both longitudinally as well as laterally to a first floor board. Further, the breaks enable at least in one direction an offset lying against each other of the floor boards.

The sealing lip and the connection geometries are made of plastic. They can be applied advantageously to the prefabricated base plate in a cycle by means of injection molding technology. Through the use of injection molding technology, a continuous production in series production is possible and the boards are delivered ready to install. As a result, joint sealing with integrated connection geometry is achieved. The sealing lip and the connection geometries can be made of the same plastic material. For example, thermoplastics or thermoplastic elastomers can be used. Suitable examples of thermoplastics are polyolefins such as e.g. polypropylene or polyethylene. These are widespread and easily obtainable.

However, other thermoplastic plastics can also be used. Thermoplastic elastomers are generally known. They can be block copolymers, which are made of hard and soft blocks. The hard blocks are thereby formed from thermoplastics and the soft blocks from elastomers like rubber. The thermoplastic hard portion can be crystalline or amorphous. Generally known thermoplastic elastomers can be used, which are differentiated in a conventional manner depending on the polymer type of the thermoplastic as thermoplastic elastomers based on amide, ester, olefin, styrene or urethane.

According to a preferred embodiment, the sealing lip is made of a more elastic, i.e. softer, material than the connection geometries. Thermoplastic elastomers can thus be used advantageously for the sealing lip and thermoplastics for the connection geometries. Particularly advantageous are material pairs, in which the hard portions of the thermoplastic elastomer for the sealing lip are formed from the same thermoplastic material as used for the connection geometries. For example, if the connection geometries are formed from polypropylene, the sealing lip can be made of a block copolymer, the hard portions of which are polypropylene. Conventional additives like e.g. bonding agents, colorants, etc. can be added to the plastic materials.

In one embodiment, the sealing lip and the connection geometries are formed from different plastic materials. In one embodiment, the sealing lip is formed from a plastic, which is more elastic than the plastic material for the connection geometries. In one embodiment, the sealing lip is formed from a thermoplastic elastomer and the connection geometries from a thermoplastic plastic. In one embodiment, the plastic material for the connection geometries and the plastic material for the sealing lip have different melting points.

For example, bonding agents can be added in particular to the plastic material for the sealing lip, which improves the adhesion of the sealing lip to the wood-based material of the base plate. Bonding agents can make sense when for example the plastic material of the sealing lip and/or the connection geometries has a non-polar character since wood-based materials generally have a polar character. For this, any suitable bonding agent can be used, as is known in the production of wood/plastic compounds for improving the adhesion of plastics to wood materials. Examples are VC/VA maleic anhydride copolymers (VC: vinyl chloride; VA: vinyl acetate), maleic anhydride (MAH), grafted polyolefins like MAH-grafted polypropylene or polyethylene, polymeric diphenylmethane diisocyanate (PMDI) or PMDI emulsified in water (EMDI). The percentage of bonding agent in the plastic material can be selected depending on the need and is normally 2-5 wt.-%. With colorants (pigments, dyes), in particular the sealing lips visible in the connected state of the floor boards can be colored based on need and desire. The hydrophobizing of the top sides of the floor boards can be performed for example through impregnation or surface-sealing with UV oil, duroplast-based paints or a synthetic wax, for example based on polypropylene or polyethylene.

According to a second aspect of the invention, the floor board according to the invention has a base plate with a top side, a bottom side and at least four side surfaces, wherein a connecting element is arranged along the side surfaces, which has a sealing lip and a connection section with connection geometries, wherein the connecting element is made of a multi-component material, which comprises at least two plastics, wherein at least one first plastic is a soft plastic and at least one second plastic is a hard plastic.

The connection geometries are thereby designed such that they permit an adjoining of floor boards, in particular according to the key lock principle. Furthermore, the connection section is arranged on the sealing lip and the side surfaces and is connected with them. The connection geometries are thereby designed such that they permit an adjoining of floor boards, in particular according to the key lock principle.

The most frequently occurring connection between floor boards is the tongue and groove system. These floor coverings must thereby also be permanently connected with the subsurface (glues/screws). Many manufacturers of prefinished hardwood flooring and laminate flooring have established so-called click connections. This flooring can be installed floating since a frictional connection is also realized via the connection. In contrast to ours, all connection types have the horizontal joint direction in common. The click connections are usually patented. All conventional connection types are wood-based or respectively material-based, i.e. they are milled/molded out of the floor board.

In one embodiment, the sealing lip is arranged on the top partial section of the side surface (i.e. the partial section on the surface of the base plate) and the connection section is arranged on the bottom partial section of the side surface (i.e. the partial section on the base area of the base plate).

In one embodiment, the connection section has a first connection geometry and a second connection geometry, wherein the connection section with the first connection geometry is arranged on two abutting side surfaces of the base plate and wherein the connection section with the second connection geometry is arranged on the two other side surfaces of the base plate, and the second connection geometry comprises a shape corresponding with the first connection geometry.

In one embodiment the sealing lip of the connecting element is formed from a first, soft plastic, wherein the connection section and the connection geometries of the connecting element are formed from at least one second, hard plastic.

In one embodiment, the sealing lip of the connecting element is formed from a first, soft plastic, wherein the connection section and the connection geometries of the connecting element are formed from at least one second, hard plastic and at least one additional, soft plastic. Alternatively, further, additional plastic materials and components (e.g. another hard plastic) are possible.

In one embodiment, the sealing lip of the connecting element is formed from a first, soft plastic, wherein the connection section has a supporting frame made of a second, hard plastic, and wherein the supporting frame is surrounded by at least one additional, soft plastic in sections on the outer surface of the supporting frame and is connected with it. Thus, the connection section with the connection geometries of the connecting element is formed by at least one hard plastic and at least one soft plastic arranged on the outside of the supporting frame.

In one embodiment, the sealing lip of the connecting element is formed from a first, soft plastic, wherein the connection section has a supporting frame made of a second, hard plastic and wherein the supporting frame is completely surrounded on the outer surface of the supporting frame by at least one additional, soft plastic and is connected with it.

The connection section preferably has a supporting frame made of a second, hard plastic on the "inside" of the connection section and of the connection geometries, wherein the supporting frame (at least in sections) is preferably surrounded by at least one softer, additional material so that the outer surface of the connection section is surrounded at least in sections by a soft plastic material.

Through the use of a hard plastic in the form of a supporting frame, the form stability and accuracy of fit of the soft components can be considerably improved. The hard component supports the form stability so that the frictional and form fit between the corresponding connection geometries is increased. The connection is stiffer so that loads are evenly distributed over the entire flooring composite. The soft component fulfils the function of the seal and also ensures easier joining through its elasticity since the material can be compressed. Moreover, the soft component enables a (footfall) sound absorption in the connection.

Furthermore, it is ensured that the used (organic) floor board can still swell and shrink through changes in the room climate. The thereby occurring tension are received and compensated for by the soft component. A composite material with the sum of the individual properties is created through the use of several plastic types with different properties.

In one embodiment, the sealing lip of the connecting element is made of a first, soft plastic, wherein the connection section has a supporting frame made of a second, hard plastic and wherein the supporting frame is surrounded by at least one additional, soft plastic in sections on the outer surface of the supporting frame and is connected with it so that the connection geometries (in particular a first and a second connection geometry) are formed. The connection section thus has connection geometries, which are made of a soft plastic at least in sections in their outer surfaces.

In one embodiment, the sealing lip and a partial area of the connection section are made of one piece of the same soft plastic.

In one embodiment, the sections of the connection section and of the connection geometries, which are made of a soft plastic material, are arranged on the outer surface of the supporting frame such that during a connection of two floor boards the connection geometries engage with each other such that the sections formed by the soft plastic contact each other in the connected state. For example, a first connection geometry and a second connection geometry are formed in sections by a soft plastic (wherein it has a supporting frame made of a hard plastic on the "inside"), that during a connection of the first with the second connection geometry the two connection geometries engage with each other such that the sections made of the soft plastic contact each other. Thus, in the connected state, the outer surfaces of the supporting frame and thus the outer surfaces of the side surfaces are surrounded by the connection geometries and the sealing lip completely by the first, soft plastic of the sealing lip and the other soft plastic of the connection section.

The first and the other soft plastic (for section-wise enclosure of the supporting frame) can thereby be made of the same material. Alternatively, the section-wise enclosure of the supporting frame can take place by means of additional plastics so that one section is encompassed by a soft plastic and another section by a different soft plastic. The section-wise enclosure preferably takes place by the same plastic. The supporting frame can be made of one piece of a hard plastic material. Alternatively, the supporting frame is formed from different components (which have the same or differently hard plastic materials). The supporting frame is preferably formed from one piece of a hard plastic.

In a preferred embodiment, the sealing lip and the section-wise enclosure of the supporting frame have the same plastic, wherein in particular the sealing lip and a partial area of the connection section are designed as one piece.

In particular, the sealing lip is arranged on the top partial section of the side surface (i.e. the partial section on the top surface of the base plate) and the connection section on the bottom partial section of the side surface (i.e. the partial section on the base surface of the base plate).

In one embodiment, the floor board has a protruding ledge on two abutting side surfaces of the base plate on the top side, wherein the two opposite-lying side surfaces are planar and wherein the connection section with a first connection geometry is arranged on the bottom side of the ledges and the connection section with a second connection geometry is arranged along the bottom edge of the planar side surfaces.

In one embodiment, the floor board has a protruding ledge on two abutting side surfaces of the base plate on the top side, wherein the two opposite-lying side surfaces are planar and wherein the connection section with a first connection geometry is arranged on the bottom side of the ledges, and the connection section with a second connection geometry is arranged along the lower edge of the planar side surfaces. The sealing lip made of the soft plastic is thereby applied along the side surfaces. The connection section has a supporting frame made of the hard plastic, wherein the supporting frame is surrounded in sections on its outer surface by another, soft plastic such that the first connection geometry and the second connection geometry are formed.

In one embodiment, the soft plastic has a Shore hardness A of 10 to 95, and the hard plastic has a Shore hardness D of 10 to 95.

In one embodiment, the soft plastic has a Shore hardness A of 30 to 85, and the hard plastic has a Shore hardness D of 40 to 80.

In one embodiment, the soft plastic has a Shore hardness A of 60 to 80, and the hard plastic has a Shore hardness D of 60 to 80.

In one embodiment, the soft plastic is a thermoplastic elastomer, and the hard plastic is a thermoplastic.

In one embodiment, the soft plastic is a soft thermoplastic elastomer and the hard plastic is a hard thermoplastic elastomer.

In one embodiment, the soft plastic is a thermoplastic elastomer with a Shore hardness A of 10 to 80, and the hard plastic is a thermoplastic elastomer with a Shore hardness A of 80 to a Shore hardness D of 80.

In one embodiment, the soft plastic is a thermoplastic elastomer with a Shore hardness A of 30 to 80, and the hard plastic is a thermoplastic elastomer with a Shore hardness D of 30 to 80.

In one embodiment, the soft plastic is a thermoplastic elastomer with a Shore hardness A of 60 to 80, and the hard plastic is a thermoplastic elastomer with a Shore hardness D of 50 to 70.

Particularly advantageous are material pairings, in which the hard portions of the thermoplastic elastomers are made of the same thermoplastic material as used for the parts of the connecting element (hard plastics). For example, if polypropylene is used as the hard plastic, the soft plastics (sealing lip and sections of the connection section) can be made of a block copolymer, the hard portions of which are polypropylene.

In one embodiment, the first connection geometry has a groove which is open toward the bottom, which is bordered by a lip toward the outside, wherein the groove has an undercut along its walls and wherein the second connection geometry has a groove open toward the top, which is bordered by a lip toward the outside, and the groove has an undercut along its walls, wherein the shape and dimension of the first connection geometry is complementary to the shape and dimension of the second connection geometry.

In one embodiment, the lip of the first connection geometry and the lip of the second connection geometry are made of a soft plastic, wherein the groove of the first connection geometry and the groove of the second connection geometry are made of a hard plastic.

In one embodiment, the connection section with the connection geometries is formed by a supporting frame made of a hard plastic, wherein the supporting frame has and forms the groove of the first connection geometry and the groove of the second connection geometry and wherein the lip of the first connection geometry and the lip of the second connection geometry has a partial area of the supporting frame as the core and the final shape of the lip is formed from an enclosure of the core area of the supporting frame by means of a soft plastic.

In one embodiment, the connection section with the connection geometries is formed by a supporting frame made of a hard plastic, wherein the supporting frame has and forms the groove of the first connection geometry and the groove of the second connection geometry and wherein the inner walls of the groove of the first and/or second connection geometry have a bent undercut and the lip of the first connection geometry and the lip of the second connection geometry have a partial area of the supporting frame as the core and the final shape of the lip is formed from an enclosure of the core area of the supporting frame by means of a soft plastic. In particular, sealing strips made of a soft plastic are arranged on the inner wall of the groove of the first and/or second connection geometry below or respectively above (depending on the type of connection geometry) the undercut.

In one embodiment, the sealing lip and the outer surface of the lip of the first connection geometry is made of one piece of a soft plastic.

In one embodiment, the sealing lip and the sealing strips of the second connection geometry are made of one piece of a soft plastic.

In one embodiment, the lip of the first connection geometry and the lip of the second connection geometry each have at least one slot at least in sections. The slot can thereby be applied exclusively in the soft plastic of the lip. The slot preferably extends both onto the soft plastic as well as the core area of the lip, which is formed by the supporting frame made of a hard plastic.

In one embodiment, the lip of the first connection geometry and the lip of the second connection geometry each have a series of slots, which are separated from each other by means of a web, wherein in particular the web has a thickness, measured along the longitudinal extension direction of the lip, of 2 mm to 50 mm.

In one embodiment, the supporting frame has reinforcing elements (for example nibs and web), which can be inserted into corresponding openings in the partial area of the connecting element, which is made of a soft plastic, and a reinforcement of the connecting element is thus achieved. The number and the dimensions of the reinforcing elements can be adjusted for the desired rigidity (depending on the material used). The more reinforcing elements and the longer (and wider) these elements, the more the rigidity is increased.

In one embodiment, the corners of the connecting element have corresponding stabilizing elements, such as roundings and corresponding hollows in order to increase the stability of the installed boards.

With respect to further advantages and special embodiments of the connection geometries, we also refer to the detailed description with respect to the first aspect of the invention.

The embodiments listed further below apply both for the floor boards according to the first aspect of the invention as well as for the floor boards according the second aspect of the invention (if not explicitly explained otherwise).

Suitable examples for thermoplastics are polyolefins such as for example polypropylene or polyethylene. These are widespread and easily obtainable. However, other thermoplastic plastics can be used.

Generally, all used plastics, in particular hard components, can be filled and/or reinforced. All conventional materials, such as e.g. talcum, fiber glass, carbon fiber, plant fibers, etc. are hereby possible.

A thermoplastic elastomer in terms of the invention is to be understood as polymer materials according to DIN EN ISO 18064, which behave entropy-elastically (rubber elastically) in the service temperature range. In the case of a thermoplastic elastomer, the tensile deformation remainder is less than 50%. The thermoplastic elastomers have a melting range above its service temperature range (yield range). The cold temperature standard TR or respectively the glass transition temperature Tg generally lie below 0° C.

The thermoplastic elastomers in twirls of the invention can be based on polymer blends (intensive mixing of thermoplastics and elastomers, like EPM, EPDM, NR, etc.) or block copolymers (combination of hard and soft phases (two- or multi-phase) in one polymer). Hard, meltable phases are generally combined with soft, elastic phases. Block copolymers are polymers which are made of hard and soft blocks. The hard blocks are thereby made of thermoplastics and the soft blocks are made of elastomers like rubber. The thermoplastic hard portion can be crystalline or amorphous.

A thermoplastic elastomer in terms of the invention has in particular a Shore hardness A of 30 to a Shore hardness D of approx. 75. It is thereby possible to differentiate between a soft thermoplastic elastomer with a Shore hardness A of 30 to approx. 85 and a hard thermoplastic elastomer with a Shore hardness A of 85 to a Shore hardness D of approx. 75.

Generally known thermoplastic elastomers can be used, which are differentiated in a conventional manner depending on the polymer type of the thermoplastics as thermoplastic elastomers based on amide, ester, olefin, styrene or urethane.

In particular, the following thermoplastic elastomers (TPE) can be used: TPA: polyamide TPE; TPA-EE: TPA, soft segments with ether and ester bonds; TPA-ES: TPA with polyester soft segments; TPA-ET: TPA with polyether soft segments; TPC: copolyester TPE; TPC-EE: TPC, soft segments with ether and ester bonds; TPC-ES: TPC with polyester TPE with polyester soft segments; TPC-ET: TPC with polyether soft segments; TPO: olefin TPE; TPO-(EPDM+PP): ethylene/propylene/dien+polypropylene; TPO-(EVAC+PVDC): ethylene/vinyl acetate+polyvinyl chloride; TPS: styrene-TPE; TPS-SBS: styrene/butadiene block copolymer; TPS-SIS: styrene/isoprene block copolymer; TPS-SEBS: styrene/ethylene butylenes/styrene block copolymer; TPS-SEPS: styrene/ethylene propylenes/styrene block copolymers; TPU: urethane TPE; TPU-ARES: aromatic hard segments, polyester soft segments; TPU-ARET: aromatic hard segments, polyether soft segments; TPU-AREE: aromatic hard segments, soft segments with ether and ester bonds; TPU-ARCE: aromatic hard segments, polycarbonate soft segments; TPU-ARCL; aromatic hard segments, polycaprolactone soft segments; TPU-ALES: aliphatic hard segments, polyester soft segments; TPU-ALET: aliphatic hard segments, polyether soft segments; TPV: TPE with cross-linked rubber.

The classification of the TPEs into 7 main groups thereby takes place based on their chemical structure. The used monomer units were named with the above abbreviations according to DIN EN ISO 18064.

In one embodiment, the soft plastic material is selected from one of the thermoplastic elastomers listed above (for the sealing lip and, if applicable, partial areas of the connection section), wherein the hard plastic material (for the connection geometries, the connection section or respectively the supporting frame) is selected from a thermoplastic, such as for example polypropylene.

In one embodiment, the soft plastic material (for the sealing lip and, if applicable, partial areas of the connection section) is selected from a dynamically vulcanized thermoplastic (TPV), wherein the hard plastic material (for the connection geometries, the connection section or respectively the supporting frame) is selected from a thermoplastic, such as for example polypropylene.

TPV is a mixture of polypropylene and dynamically vulcanized rubber EPDM (PP/EPDM "ethylene propylene diene rubber"), the properties of which are comparable with those of rubber parts. In particular, TPV, in comparison with other TPEs, has a higher heat resistance (130° C. to 140° C.), so that TPV is preferred above all in an area with high temperatures (e.g. sauna). For example, RAU-TPEV, a modified PP with cross-linked EPDM portions, can be used as the material.

With respect to further properties, we refer to the safety datasheet AV0190 with respect to RAU-TPEV from the company REHAU ("http://www.rehau.com/linkableblob/LT_It/872506/data/Materialmerkblatt_RAU-TPE-V_AV0190-data.pdt").

In one embodiment, the soft plastic material (for the sealing lip and, if applicable, partial areas of the connection section) is PVC combined with softeners (polyvinyl chloride).

Material pairings, in which the hard portions of the soft plastic materials, in particular a soft thermoplastic elastomer, (for the sealing lip and if applicable partial areas of the connection section) are particularly advantageously made of the same thermoplastic material as is used for elements made of hard plastic material (for the connection geometries, the connection section or respectively the supporting frame). If, for example, the connection geometries are made of polypropylene, the sealing lip can be made of a block copolymer, the hard portions of which are polypropylene.

Conventional additives like e.g. bonding agents, colorants, etc. can be added to the plastic materials.

For example, bonding agents, which improve the adhesion of the sealing lip and the connection section or respectively the connecting elements to the wood-based material of the base plate, can be added in particular to the plastic material (both for the elements made of soft plastic as well as for the elements made of hard plastic), like e.g. the sealing lip and the connection section. Bonding agents can make sense when for example the plastic material of the sealing lip and/or the connection geometries has a non-polar character since wood-based materials generally have a polar character. For this, any suitable bonding agent can be used, as is known in the production of wood/plastic compounds for improving the adhesion of plastics to wood materials. Examples are VC/VA maleic anhydride copolymers (VC: vinyl chloride; VA: vinyl acetate), maleic anhydride (MAH), grafted polyolefins like MAH-grafted polypropylene or polyethylene, polymeric diphenylmethane diisocyanate (PMDI) or PMDI emulsified in water (EMDI).

The percentage of bonding agent in the plastic material can be selected depending on the need and is normally 2-5 wt.-%.

With colorants (pigments, dyes), in particular the sealing lips visible in the connected state of the floor boards can be colored based on need and desire.

The hydrophobizing of the top sides of the floor boards can be performed in a manner known per se, for example through impregnation or surface-sealing with UV oil, duroplast-based paints or a synthetic wax, for example based on polypropylene or polyethylene. Alternatively, a surface coating can also take place by means of a highly elastic PU enamel paint.

The floor board according to the invention is in particular rectangular. It can be oblong or square, wherein oblong floor boards are more conventional. Alternatively, the floor boards according to the invention can also be designed polygonal (in particular with an even number of sides).

The base plate can be made of solid wood or have a layer construction, with support plate, wherein at least one additional layer is applied to the support plate.

The base plate can be made of solid wood or have a layer construction, with support plate, wherein at least one additional layer is applied to the support plate.

All materials that can be formed into board-like materials are generally suitable. Overall, the use of tiles and stones as well as vinyl flooring is conceivable. In particular, wood-based material is used.

In principle, any wood-based material can be used for production. Deciduous and coniferous woods as well as chemically and/or thermally modified woods, as well as wood composites can be used. Wood, solid or as cover or respectively decorative layer, are preferably used, the durability classes of which are classified according to DIN EN 350-2 at least as class 2, preferably as class 1 to 2. Examples of such domestic woods suitable for moist or wet floor areas are thus oak and locust. Naturally, other woods can also be used based on need and desire.

Wood composites are materials, the substrate of which consists of wood components, which are obtained through a grinding process and are then joined through a matrix with binding agent properties. Examples are fiber, particle and OSB boards but also plywood, etc. For the layer construction, the support plate can also be made of solid wood, also of a solid wood of a lower quality, or glued wood boards, particle or fiber boards or other wood composites etc. The cover layer or decorative layer can be made of real wood veneer as well as any other decorative material.

The floor boards according to the invention are suitable in particular for use for floorings, wall coverings (facades) or ceiling coverings in moist or wet environments, both inside and outside.

Through the connection concept according to the invention of the first aspect and second aspect of the invention, adjoined floor boards are locked together permanently on one hand so that an accidental separation is prevented. On the other hand, they can be separated from each other as needed without being destroyed through the appropriate application of force. The adjoining of individual boards is possible through a vertical downwards movement; a pivoting is not required. Thus, a similarly simple and uncomplicated adjoining and immobilization of a floor board to be installed adjacently can be performed on all sides of a board.

With the floor boards according to the invention, it is possible to obtain a joint-less connection for wood floors even outside. It is no longer necessary to provide a gap as a joint between the wood boards in order to ensure that water drains and the wood can expand, if necessary. These joints have various disadvantages. Debris like leaves, needles, etc. and decaying material thus collects here. Moreover, the joints can represent a not insignificant risk of accident, in particular when going barefoot. Through the closing of the seam possible according to the invention with the help of the sealing lips, these disadvantages can be eliminated while retaining the advantages of a wood-based floor.

Water can drain along the surface, wherein a slight slope, in particular of 1-3%, can be provided to support said drainage.

For the production of the floor board according the invention, the contour of the base plate made of wood or wood-based material is first created. For this, conventional wood-processing techniques like milling, chipping, etc. can be used.

Subsequently, the circumferential sealing lip and the connection geometries are applied along the side surfaces of the base plate. This takes place particularly advantageously by means of injection molding.

For this, a negative mold (cavity) is used for the injection molding tool, in which the structures for the sealing lip and the connection geometries are specified. According to the invention, the preshaped base plate is placed in the cavity, immobilized if necessary and the tool is closed. The volume of the cavity to be filled is determined by the inserted base plate. Highly pressurized plasticized plastic is injected via the injection opening. The plasticization and the injection can take place with the same injection unit, like a screw injection molding machine or plunger injection molding machine with screw pre-plasticization The plasticized plastic mass is fed to the structure for the sealing lip or respectively the connection geometries via heatable distribution channels in the tool. Structures made of different plastics can thereby be obtained in a single molding process, for example according to the multi-component injection-molding process. For example, first the plasticized plastic mass can be injected for the formation of the sealing lips and fed to the corresponding structures and then in a second step the plasticized plastic mass for the formation of the connection geometries or vice versa.

If different plastics with different melting points are used for the creation of the sealing lip and the connection geometries, it is preferred to first inject the plastic mass with the lower melting point and then the plastic mass with the higher melting point. The plasticized plastic mass with the higher melting point slightly melts on the boundary surface the surface of the plastic mass with the lower melting point, whereby a particularly deep connection of the two plastics at the boundary surface is achieved.

The sealing lip and the connection geometries on the base plate can be produced with a high accuracy, extremely filigree structure and with a high throughput.

As a result, ready-to-install boards in high numbers are obtained according to the method according to the invention.

It is thus possible according to the invention, to provide a solid wood floor or wood-based floor in the multi-layer construction for the wet area, which combines the aesthetics and comfort of a wood floor with the requirements for use in a wet and moist environment in an economical manner.

The present invention is explained in greater detail below with reference to the attached figures based on a preferred design.

Figure 2:
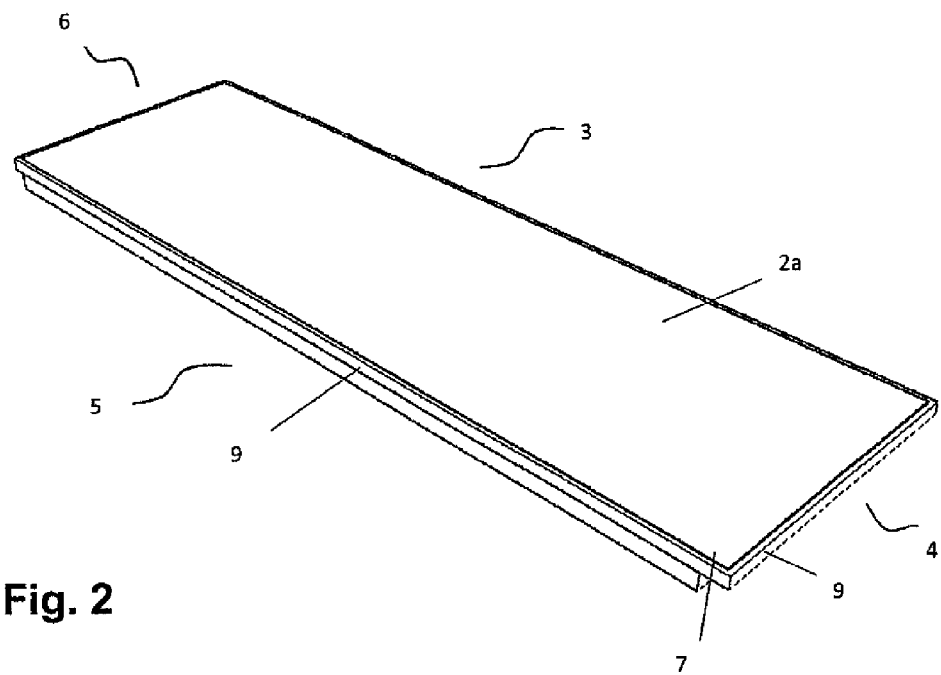
Figure 3:
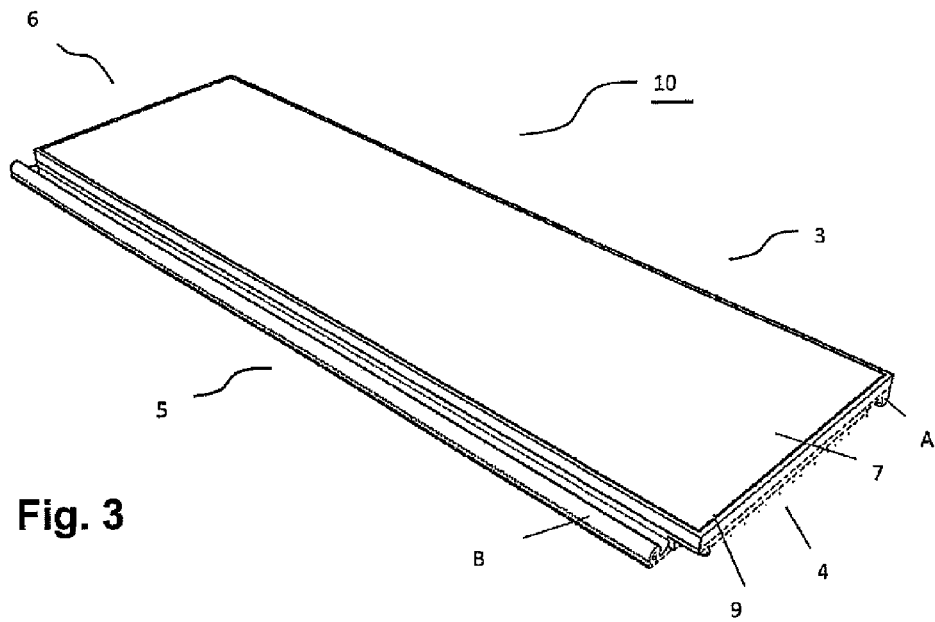
Figure 4:
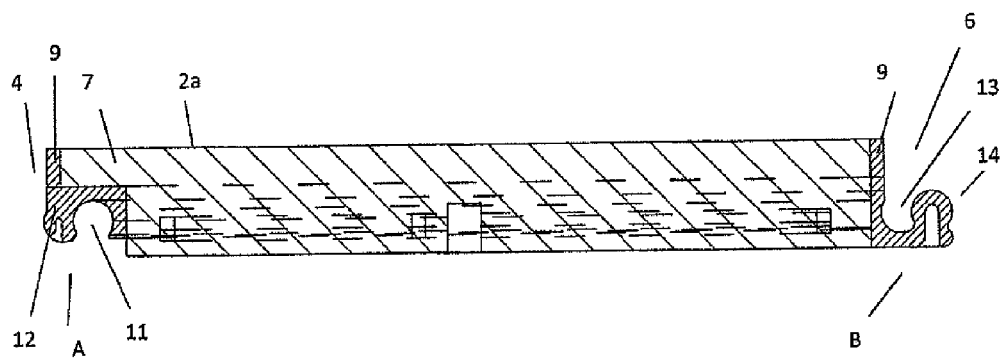
Figure 5:
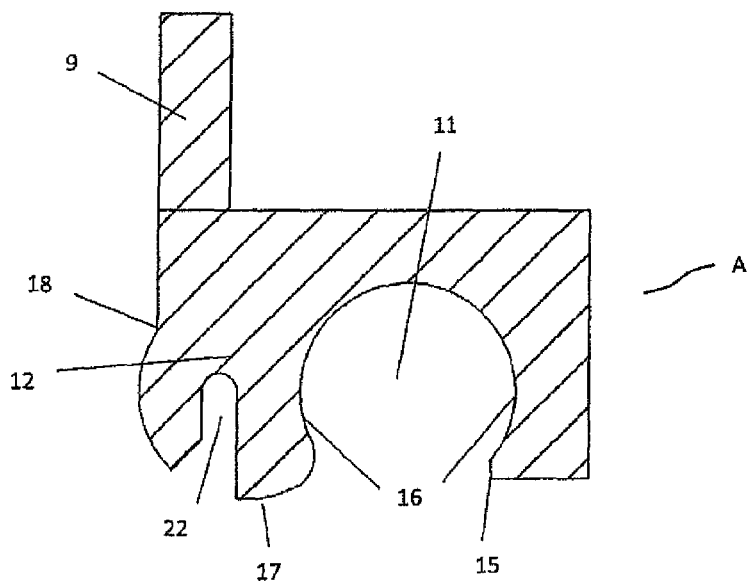
Figure 6:
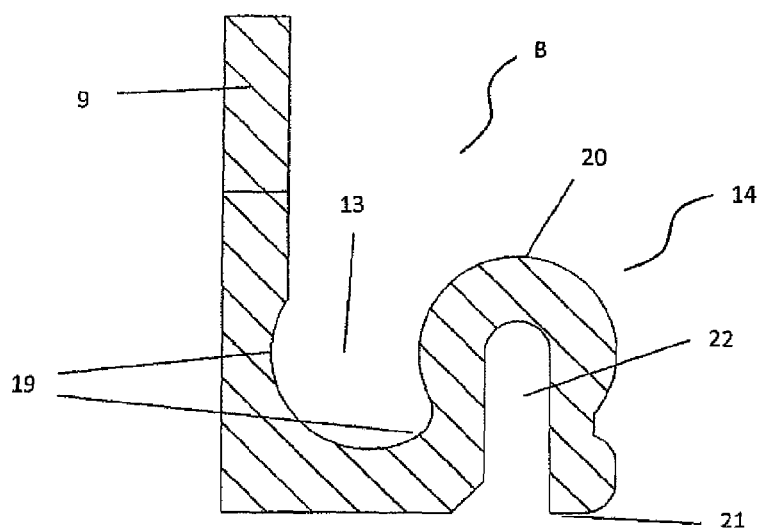
Figure 7:
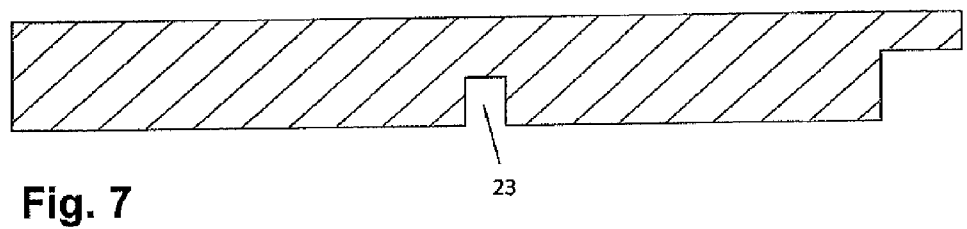
Figure 8:
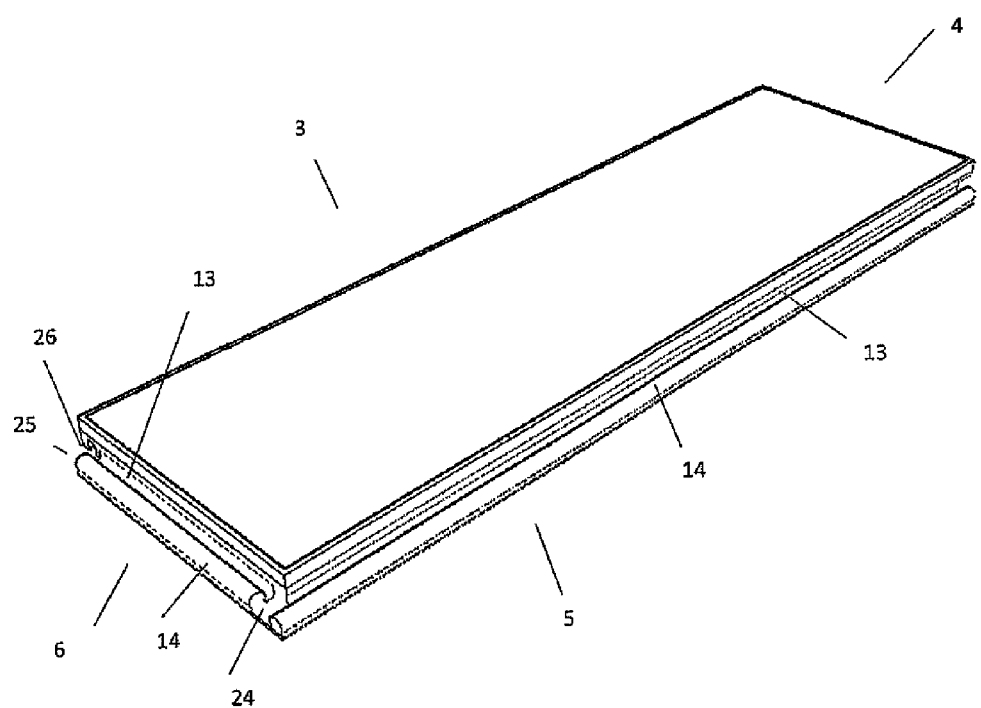
Figure 9:
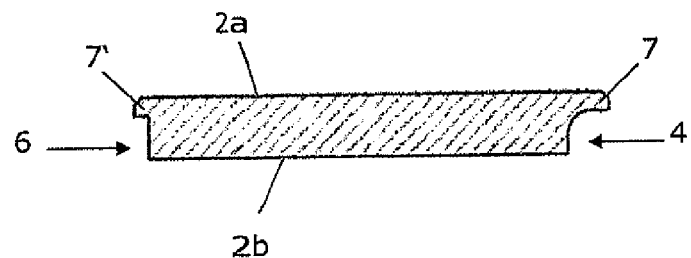
Figure 10:
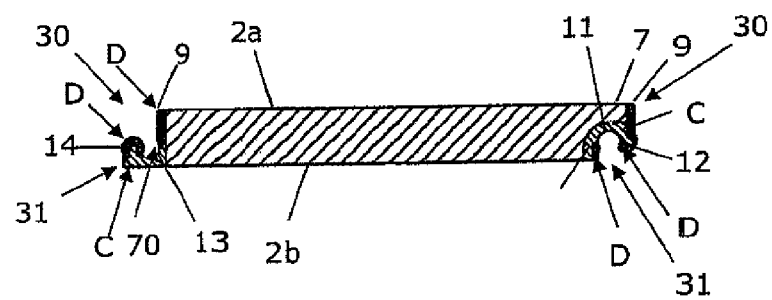
Figure 11:
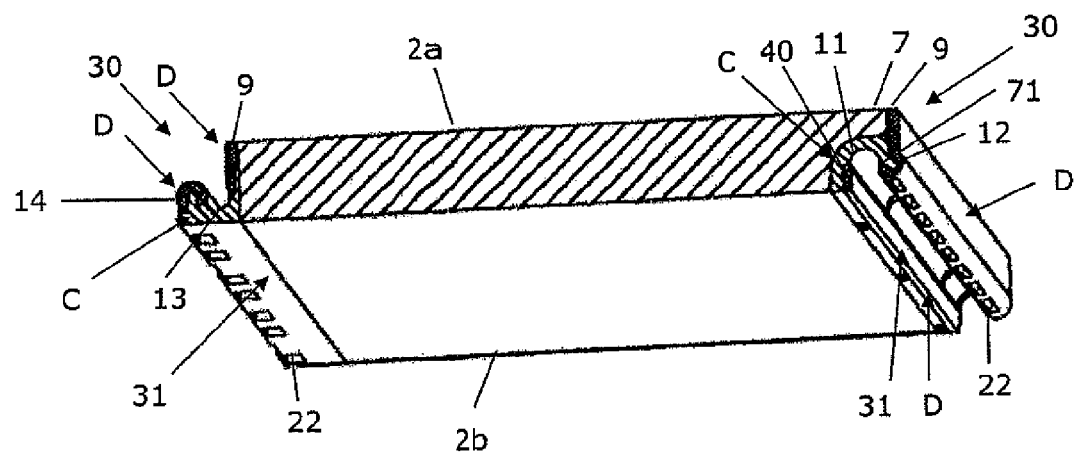
Figure 12:
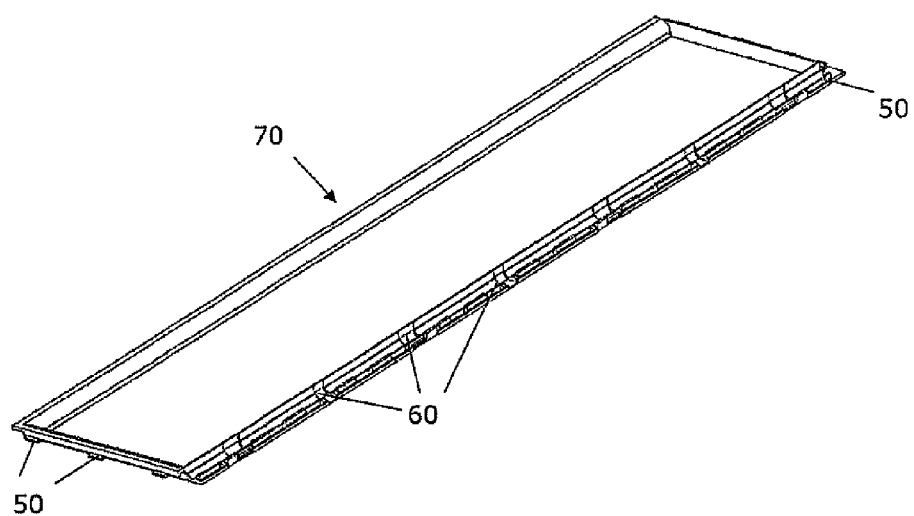
Figure 13:
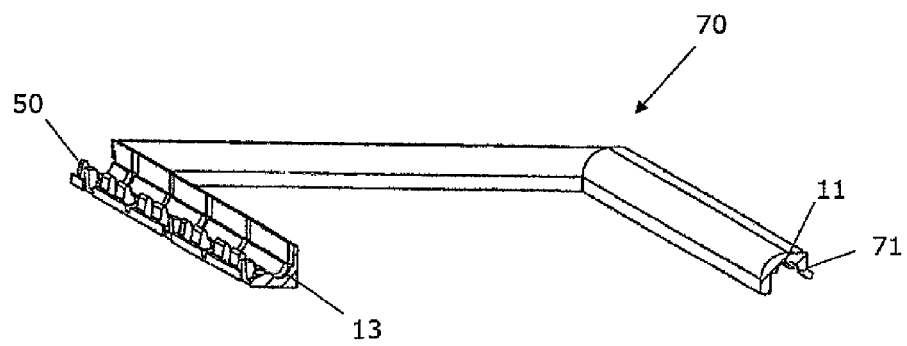
Figure 16:
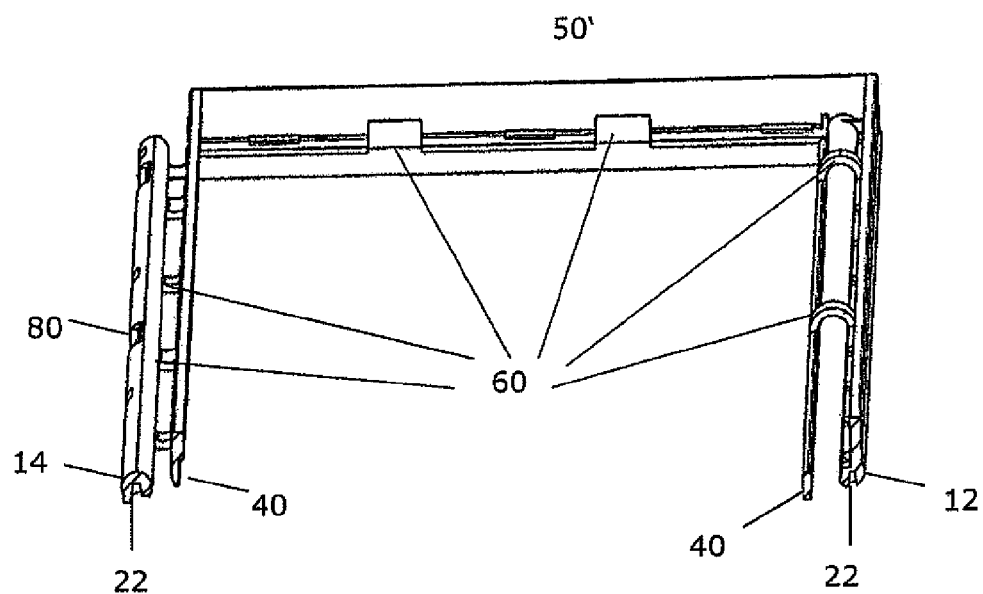
Figure 17:
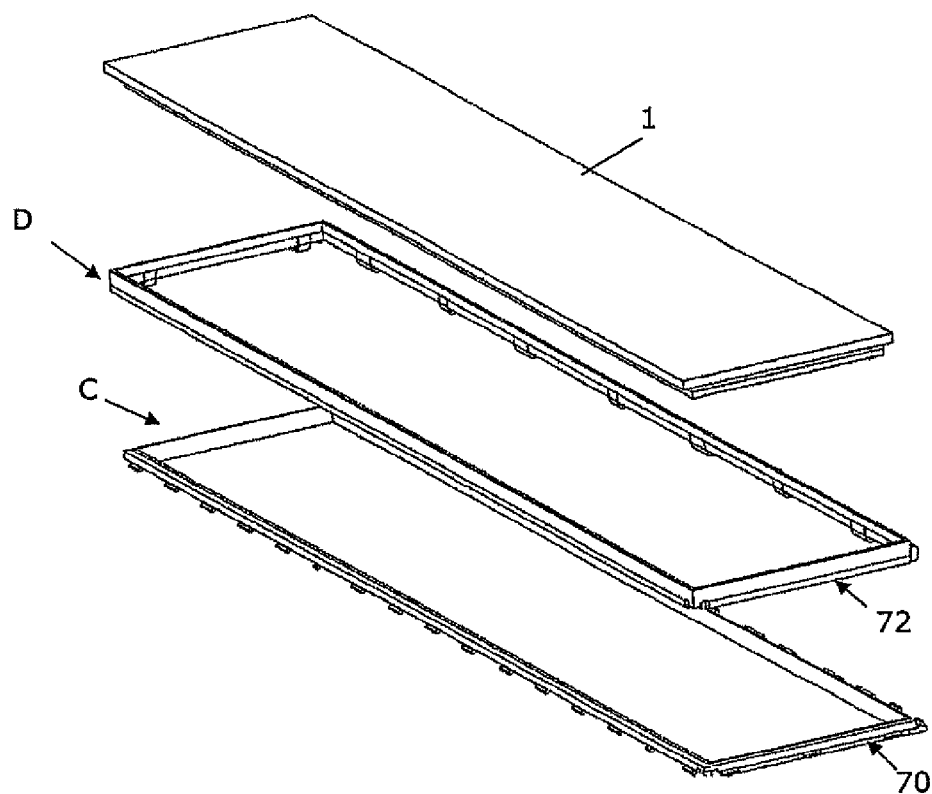

They show in:

FIG. 1 a diagonal top view from the front of a base plate according to the invention;

FIG. 2 the view according to FIG. 1 with sealing lip along the side surfaces of the base plate of FIG. 1;

FIG. 3 the view according to FIGS. 1 and 2 with connection geometries provided on the sealing lip with groove and lip;

FIG. 4 a cross-section through the floor board according to the invention as is shown for example in FIG. 3;

FIG. 5 a cross-section through one design of the first connection geometry;

FIG. 6 a cross-section through one design of the second connection geometry, which is complementary to the first connection geometry according to FIG. 5;

FIG. 7 a cross-section through a further embodiment of the floor board according to the invention with connection geometries according to FIGS. 5 and 6 and FIG. 8 a view from rear left of the embodiment according to FIG. 3;

FIG. 9 a cross-section through a floor board for dry parquet;

FIG. 10 a cross-section through a floor board with a connecting element from a multi-component system;

FIG. 11 a diagonal view of the cross-section in FIG. 10;

FIG. 12 a diagonal view of the supporting frame made of a hard plastic;

FIG. 13 a 3D cross-section of the supporting frame in FIG. 12 from a first perspective;

FIG. 14 a 3D cross-section of the supporting frame in FIG. 12 from a second perspective;

FIG. 15 a diagonal view of the soft component D as an elastic frame;

FIG. 16 a cross-section of FIG. 15;

FIG. 17 an exploded view of the floor board from a multi-component system.

The base plate 1 shown in FIG. 1 has a rectangular, oblong shape with a top side 2a, two long side surfaces 3, 5 and two short side surfaces 4, 6. It can be seen in the short side surfaces 4 on the right front in FIG. 1 that the upper edge area of the board 1 protrudes over the bottom edge area and forms a ledge 7, which extends over the entire width of the side surface 4. A corresponding ledge 8 (not shown here) progresses along the long side surface 3 located in the back in FIG. 1. The front long side surface 5 as well as the short side surface 6 pointing toward the back (not shown here) do not have a ledge and are planar. They are correspondingly called planar side surfaces.

FIG. 2 shows the base plate 1 from FIG. 1, wherein all four side surfaces 3, 4, 5, 6 are already surrounded by a circumferential sealing lip 9. The sealing lip 9 extends beginning from the top side 2a on the side surfaces 3, 4, 5, 6 downward up to the bottom edge of the ledges 7 or respectively 8.

In FIG. 3, the floor board 10 according to the invention is shown in its finished state, wherein the connection geometries A, B are connected with sealing lip 9. The first connection geometry A is thereby arranged below the ledges 7, 8 on the long and short side surfaces 3, 4 with ledge and the second connection geometry B on the planar, long and short side surfaces 5, 6 along the bottom edge. FIG. 3 shows the second connection geometry B progressing along the front long side surface 5 and the first connection geometry A along the short side surface 4 in the front in the figure and its transition to the first connection geometry A on the long side surface 3 in the back in the figure. The connection geometries A, B abut directly at the sealing lip 9.

FIG. 4 shows a cross-section through a floor board 10 as well as the connection geometries A, B on the two short side surfaces 4, 6 in FIG. 3. The arrangement of the first connection geometry A on the bottom side of the ledge 7 and the sealing lip 9 on the side, which extends on the front surface of the ledge 7 from the top side 2a of the base plate 1 up to into the lip 12 of the connection geometry A, can be seen on the left in the figure. The lip 12 borders the groove 11 which is open toward the bottom toward the outside. The second connection geometry B and the sealing lip 9 of this side are arranged on the opposite-lying planar short side surface 6. The sealing lip 9 extends downward from the top side 2a along the side surface. A groove 13 open toward the top, which is bordered by the lip 14 toward the outside, is shaped on the bottom edge of the sealing lip 9.

The connection geometries A, B are shaped tightly and firmly on the side surfaces and the bottom side of the ledge 7. Sealing lip 9 and connection geometries A, B thereby merge with each other and form in this manner a joint seal with an integral connection geometry.

For installation, the lip 14 of the second connection geometry B of a board to be installed is pushed from above into the groove 11 of the first connection geometry A of an installed board, wherein the lip 12 of the first connection geometry A engages at the same time in the groove 13 of the second connection geometry B. The grooves 11, 13 and the associated lips 12, 14 have a complementary contour, similar to the female and male parts of a die. When being pressed into the grooves 11, 13, the lips 12, 14, 20 are compressed and return to their original shape after unloading in the groove, i.e. they snap in place. As a result, a form-fit and frictional connection or respectively interlocking of the boards is achieved.

A preferred design with contours of sealing lip 9 with complementary first and second connection geometries A, B is shown in detail in FIGS. 5 and 6.

FIG. 5 shows a sealing lip 9 with the first connection geometry A. The groove 11 is open toward the bottom and has a bent undercut 16 in the area of the opening 15 on both sides. In the embodiment shown in the figure, the groove 11 has an arched contour. The walls of the groove 11 oriented toward the base plate 1 progress along the side surface 4 (on the right in FIG. 5). The outward pointing walls of the groove 11 form the lip 12.

The free end 17 and the outer walls of the lip 12 also have an arched rounding, wherein the arched rounding of the outer walls ends in a level surface with an inner curvature 18 and merges into the sealing lip 9. The transition from connection geometry A to sealing lip 9 is indicated in FIG. 5 by a diagonal line.

As can be seen in particular in FIG. 4, the sealing lip 9 with the first connection geometry A progresses from the top side 2a of the base plate 1 along the front surface of the ledges 7, 8 up to the bottom side of the ledges 7, 8 and connects there to the connection geometry A. The sealing lip 9 adheres permanently to the outer surfaces of the base plate 1.

As shown in FIG. 4, the sealing lip 9 with the first connection geometry A ends at a distance above the bottom edge of the floor plate. This distance to the bottom edge takes into account the ground height of the second connection geometry B so that neighboring floor boards can be connected flush with each other.

FIG. 6 shows the sealing lip 9 with the second connection geometry B, which forms the counterpiece to the sealing lip 9 with the first connection geometry A according to FIG. 5. The second connection geometry B progresses along the bottom edge of the sealing lip 9 on the planar side surfaces 5, 6. The walls of the groove 13 aligned with the base plate 1 (on the left in FIG. 6) progress along the side surface of the base plate and merges toward the top into the sealing lip 9. The groove 13 is bordered by the lip 14 at the side pointed toward the outside. Bent undercuts 19 are provided on the inner walls of the groove 13, wherein the inner contour of the groove 13 corresponds to the outer contour of the lip 12 of the first connection geometry A.

In the connected state, the sealing lip 9 with the connection geometry of the first board should be flush with the sealing lip 9 and complementary connection geometry of the second board at least on the top side and form a mainly level surface. For this, as can be seen in FIG. 4, the first connection geometry A ends at a distance above the bottom side of the base plate 1. The height of the lip 14 (distance of the crown 20 from the contact surface 21) corresponds to the distance of the groove base of the groove 11 to the bottom side of the base plate 1. The depth of the groove 13 and the depth of engagement of the lip 12 are coordinated accordingly.

It is particularly preferable when a form-fit and frictional connection is formed, in which the inner contours and the complementary outer contours of the lips mainly lie against each other. "Mainly" means that it cannot be excluded from a manufacturing point of view that, in individual areas, the contours of the connection geometries do not lie against each other. However, according to the invention, a form fit with adjoining contours of the groove and the therein engaging lip is preferred.

According to a further embodiment, channel-like slots 22 can be provided in the walls of the lips 12, 14, which extend in the longitudinal direction from the bottom side into the interior of the lips 12, 14. These channel-like slots 22 increase the flexibility of the lips 12, 14 and facilitate the pressing into the complementary grooves 11, 13. The lips 12, 14 can be more easily compressed while being pressed in and return to their original shape when unloaded under formation of a snap connection. Through the formation of the snap connection, a locking with safeguard against the accidental release of the boards takes place to a certain extent on one hand. On the other hand, they can be separated from each other as needed without being destroyed through the appropriate application of force.

Transversally progressing reinforcing elements such as braces, webs, or the like can be provided in the channel-like slots 22. These aid the reinforcement and bring about, after the snapping in of the complementary connection geometries, an increase in the frictional connection. The number and the distance of the transversally progressing reinforcing elements are selected as needed such that a sufficient compressibility of the lips can be retained.

According to one further embodiment, as shown for example in FIG. 7, one or more groove-like slots 23 can be provided in the bottom side of the base plate, which preferably extend parallel to the fiber progression.

The groove-like slots 23 can be filled with plastic material. This plastic material can be the same material that is used for the sealing lips and/or connection geometries.

Through the groove-like slots 23, the material is relieved of inner tension, in particular when using solid wood, so that deformations can be avoided. In FIG. 7, the slot has a rectangular cross-sectional shape. However, other cross-sectional shapes can also be provided.

In the corner areas of the floor boards, breaks in the connection geometries can be provided, which can be in particular sections without a lip, for facilitating the connection of boards to be installed against each other. For example, in the corner areas where side surfaces with the same connection geometries abut, on one side surface the lip can end at a distance from the lip end of the other side surface so that a lip-free section is created. In the corner areas where side surfaces with different connection geometries abut, for example a side surface with a first connection geometry A and a side surface with a second connection geometry B, the connection geometries can end at the edge, at which the two side surfaces abut.

Details of an embodiment for such connection areas are shown in particular in FIG. 8. FIG. 8 shows the floor board according to FIG. 3 in a view from rear left. The second connection geometry B with groove 13 open toward the top and lip 14 progresses along the sides 5, 6. In the corner area where the side surfaces 5 and 6 abut, a 5 lip-free section 24 is provided, which is established in that the lip 14 of the side 6 does not connect up to the lip 14 of the side 5 but rather springs back. The length of the section 24, i.e. the distance between the two lips, normally corresponds at least with the lip diameter. However, the length of the lip-free section 24 can vary as needed.

In the corner areas where a side surface with a first connection geometry A abuts with a side surfaces with a second connection geometry B, like for example in the corner area 25 lying rear left 15 in FIG. 8, the connection geometries A, B can end at the edge where the side surfaces abut. A free section 26 is thereby obtained so that further boards can be installed without hindrance from the connection geometries. The embodiment shown in FIG. 8 for the connection areas with 20 free sections 24, 25 is an example of the design of the connection areas. These can be modified depending on need, use and installation pattern.

With the floor boards according to the invention, it is also possible to install wood-based floors, also in particular solid wood floors, in moist or wet environments. For example, the floor boards according to the invention can be used in bathrooms, wellness and spa facilities, hotels, swimming pools, pool decks, cruise ships, etc. Furthermore, a jointless installation is also possible outside since the sealing lips allow a secure seal from penetrating water.

FIG. 9 shows a cross-section through a floor board. The arrangement of the first ledge 7, which extends at the short side surface 4, can be seen on the right in the figure. On the left side, the second, shorter ledge 7' extends at the short side surface 6. Here (not shown here), the first connection geometry A can be arranged on the bottom side of the first ledges 7 and 8 (8 is not shown here for clarity) and the second connection geometry B can be arranged on the bottom side of the second ledges 7 and 8' (8' not shown). The arrangement occurs analogous to FIG. 4. See FIG. 4 regarding the design of the connection geometries. However, in contrast to FIG. 4, no sealing lip is provided. The second, short ledge 7' (or respectively 8'), which enables a gap-free adjoining of individual floor boards, is arranged instead of the sealing lip.

The dimensions of the connection geometries A, B and of the first and second ledges 7, 7' (or respectively 8, 8') are thereby selected such that during the connection of two floor boards, the top area of the base plate (the side surfaces of the first and second ledges) lies opposite itself without significant hollow spaces forming between these side surfaces of the top area. In particular, the floor boards can lie against each other in a gap-free manner. The present embodiment is suitable in particular for dry parquet.

FIG. 10 shows a cross-section through a floor board. The pictured floor board has a structure comparable to that explained in FIG. 4 (or respectively in FIGS. 5 and 6 with respect to the connection geometries A, B). See FIGS. 4, 5 and 6 regarding the design and the explanations.

The main difference compared to the aforementioned figures is the design of a connecting element 30, which has a sealing lip 9 and a connection section 31, on which the connection geometries A and B are arranged. The connection geometries are designed analogous to the above figures. In particular, the connection geometries have a lip 12 or respectively 14 and a corresponding groove 11 or respectively 13.

However, the connecting element 30 is made of two components. It has a soft plastic component D (in particular a thermoplastic elastomer, like for example TPEV) and a hard plastic component C (like for example PP). The connection section 31 of the connecting element 30, which encloses the corresponding with the corresponding connection geometries A and B, thereby has a supporting frame 70 (made of the hard component D). The connection geometries (in particular the lip 12 or respectively 14 and the corresponding groove 11 or respectively 13) are thereby formed by the supporting frame 70 (made of the hard component C) and by the enclosure of the supporting frame 70 (by the soft component D). The lip 12 or respectively 14 thereby encloses on its outer surface the soft component D and as core 71 a partial section of the supporting frame 70. The groove 11 or respectively 13 is thereby formed mainly by the supporting frame made of the hard component C. Furthermore, sealing strips 40 made of a soft plastic are arranged below or respectively above the undercut. A partial section of the connection section (the lip 12), the sealing strips 40 above the groove 13 and the sealing lip 9 are thereby made of one piece of the soft plastic D.

Furthermore, the sections of the connection section and of the connection geometries that are made of a soft plastic material D are arranged on the outer surface of the supporting frame 70 such that during a connection of two floor boards the connection geometries (in particular the lip 12 or respectively 14 and the corresponding groove 11 or respectively 13 and the sealing strips 40) engage with each other such that the sections made of the soft plastic D contact each other in the connected state. Thus, in the connected state, the outer surfaces of the supporting frame 70 and thus the outer surfaces of the side surfaces 4, 5, 6, 7 are surrounded by the connection geometries A, B (and the sealing strip 40) and the sealing lip 9 completely by the first, soft plastic D.

FIG. 11 shows a diagonal view of the cross-section in FIG. 10. See FIG. 10 regarding the design and the explanations. FIG. 11 shows sequences of slots 22 in the lips 12 and 14. The slots 22 in the lips 12 and 14 of the first and second connection geometry A and B enable an easier joining in their respective corresponding connection geometry. During passage through the narrow point of the corresponding connection geometry, the diameter of the lip 12 or respectively 14 is reduced by the slot 22 and is compressed. The lip 12 or respectively 14 is unloaded again at the deepest point and snaps into its corresponding geometry of the groove 11 or respectively 13.

FIG. 12 shows a diagonal view of the partial area (here the supporting frame 70) of the connecting element 30, which is made of the hard plastic C (like e.g. PP), i.e. the hard part of the multi-component system. Furthermore, FIGS. 13 and 14 show the same partial area in a 3D cross-section from different perspectives.

See FIGS. 10 and 11 regarding the design and the explanations since this partial section mainly corresponds with the supporting frame 70 made of the hard component C in FIGS.

10 and 11. Only individual elements that could not be seen or that were hard to see in the cross-section of the above figures are shown here.

The supporting frame 70 hereby has reinforcing elements 50 (like for example nibs on the short edge and webs on the long edge), which can be inserted into corresponding openings in the partial area of the connecting element, which is made of a soft plastic (see FIGS. 15 and 16). The right side (male side) hereby shows the main structure of the first connection geometry (in particular the groove 11 and the core 71 of the lip 12) and the left side (female side) hereby shows the main structure of the second connection geometry (in particular the groove 13).

The nibs 50 (short edge) are thereby provided for reinforcing the connection geometry of the male side and the webs 50 (long edge) for reinforcing the connection geometry of the female side.

The webs 50 of the female side are completely covered with the soft component, like for example TPEV (see elastic frame 72 in FIGS. 14 and 15), wherein the TPEV has an omega shape, which has slots 22? in sections on the inside. These slots are each located between the webs. The dimensionally stable webs hold the soft component in position and thus increase the accuracy of fit and form-fit and frictional connection. The nibs 50 of the male side fulfill the same purpose as the webs 50 of the female side. They are also covered with TPEV and form in their entirety the connection geometry of the male side. The TPEV geometry is later cut in between the respective nibs (also see FIGS. 15 and 16).

Flow channels 60 are also applied for the soft component D, like e.g. TPEV. It is provided via the flow channels 60 for the TPEV that the hot plastic melt is distributed continuously and evenly as long as it is still fluid. The entire TPEV system is hereby interconnected (also see explanations for the elastic frame 72 in FIGS. 15 and 16).

FIG. 15 shows a diagonal view for the partial area (elastic frame 72) of the connecting element 30, which is made of the soft plastic D (like e.g. TPEV), i.e. the soft, elastic part of the multi-component system. A cross-section of FIG. 15 is shown in FIG. 16. The soft component D, like e.g. TPEV, is thereby incorporated via the feed points 80 and the elastic frame is designed, wherein the soft component D can be distributed further, among other things, up to the sealing lip via the flow channels 60.

The formed elastic frame 72 has a section of the connection geometries in omega shape, which has slots 22 in sections on the inside. These slots 22 are located respectively between the webs 50 of the supporting frame (see explanations for FIGS. 12 to 14). The dimensionally stable webs 50 hold the soft component of the elastic frame 72 in position and thus increase the accuracy of fit and form-fit and frictional connection.

See FIGS. 10 and 11 regarding the design and the explanations of the other elements since this partial section mainly corresponds with the area made of the soft component D in FIGS. 10 and 11.

FIG. 17 shows an exploded view of the floor board made of the multi-component system with a base plate 1, an elastic frame 72 made of soft plastic D and a supporting frame 70 made of hard plastic C. See the preceding figures that describe these basic components regarding the design and the explanations.

LIST OF REFERENCE NUMBERS

1 Base plate
2*a* Top side
2*b* Bottom side
3 Long side surface
4 Short side surface
5 Long side surface
6 Short side surface
7 (First) ledge (short side surface)
8 (First) ledge (long side surface)
7' Second ledge (short side surface)
8' Second ledge (long side surface)
9 Sealing lip
10 Finished floor board
A First connection geometry
B Second connection geometry
11 Groove of the first connection geometry
12 Lip of the first connection geometry
15 Opening of groove 11
16 Undercut of groove 11
17 Free end of lip 12
18 Inner curvature of lip 12
13 Groove open toward the top
14 Lip of groove 13
19 Undercut of groove 13
20 Crown of lip 14
21 Contact surface of lip 14
22 Slot in lip
23 Groove-like slot in base plate
24 Lip-free section in base plate
25 Corner area of sides surfaces with different connection geometries
26 Free section in corner area 25
30 Connecting element
31 Connection section
40 Sealing strips
50 Reinforcing elements
60 Flow channels
70 Supporting frame
71 Core made of a hard component
72 Elastic frame
80 Feed points

What is claimed is:

1. A floor board (10), which has a top side (2*a*), a bottom side (2*b*) and at least four side surfaces (3, 4, 5, 6), wherein respectively two opposite-lying side surfaces (3, 4, 5, 6) have connection geometries (A, B) corresponding to each other made of plastic and wherein the floor board (10) consists of a base plate (1), characterized in that a first connection geometry (A) is provided along two abutting side surfaces (3, 4) and has a groove (11) which is open toward the bottom and is bordered by a lip (12) toward the outside, and the groove (11) has an undercut (16) along its walls, and a second connection geometry (B) is provided along the abutting side surfaces (5, 6) and has a groove (13) which is open toward the top and is bordered by a lip (14) toward the outside, and the groove (13) has an undercut (19) along its walls, wherein the shape and dimension of the first connection geometry (A) is complementary to the shape and dimension of the second connection geometry (B), wherein the lip (12) of the first connection geometry (A) and the lip (14) of the second connection geometry (B) each have at least one slot (22) at least in sections, wherein two abutting side surfaces (3, 4) of the base plate (1) on the top side (2*a*) have a protruding ledge (7, 8) and the two opposite-lying side surfaces (5, 6) are planar, wherein a first connection geometry (A) is arranged on the bottom side of the ledges (7, 8), and the second connection geometry (B) is arranged along the bottom edge of the planar side surfaces (5, 6), wherein a sealing lip (9) with the connection geometries (A, B) made of plastic is applied along the side surfaces (3, 4, 5, 6).

2. The floor board according to claim 1, characterized in that the lip (12) of the first connection geometry (A) and the lip (14) of the second connection geometry (B) each have a sequence of slots (22), which are separated from each other by means of a web, wherein in particular the web has a thickness, measured along, the longitudinal extension direction of the lip (12) or of the lip (14), of 2 mm to 50 mm.

3. The floor board according to claim 1, characterized in that the sealing lip (9) and the connection geometries (A, B) are made of one piece of plastic, which has a Shore hardness A of at least 85.

4. The floor board according to claim 1, characterized in that the sealing lip (9) and the connection geometries (A, B) are made of different plastic materials, wherein in particular the sealing lip (9) is made of a soft plastic, and the connection geometries (A, B) are made of a hard plastic.

5. A floor board with a base plate, which has a top side, a bottom side and at least four side surfaces, characterized in that a connecting element (30) is arranged along the side surfaces (3, 4, 5, 6), which has a sealing lip (9) and a connection section (31) with connection geometries (A, B), wherein the connecting element (30) is made of a multi-component material, which comprises at least two plastics, wherein at least one first plastic is a soft plastic and at least one second plastic is a hard plastic, wherein the sealing lip (9) of the connecting element (30) is made of a first, soft plastic, wherein the connection section (31) and the connection geometries (A, B) of the connecting element (30) are made of at least one second, hard plastic and at least one additional or the same, soft plastic, wherein the connection section (31) has a supporting frame (70) made of the second, hard plastic, and wherein the supporting frame (70) is surrounded by at least one additional or the same, soft plastic in sections on its outer surface.

6. A floor board with a base plate, which has a top side, a bottom side and at least four side surfaces, characterized in that a connecting element (30) is arranged along the side surfaces (3, 4, 5, 6), which has a sealing lip (9) and a connection section (30 with connection geometries (A, B), wherein the connecting element (30) is made of a multi-component material, which comprises at least two plastics, wherein at least one first plastic is a soft plastic and at least one second plastic is a hard plastic, wherein the sealing lip (9) of the connecting element (30) is made of a first, soft plastic, wherein the connection section (31) and the connection geometries (A, B) of the connecting element (30) are made of at least one second, hard plastic and at least one additional or the same, soft plastic, wherein the first connection geometry (A) has a groove (11) which is open toward the bottom, which is bordered by a lip (12) toward the outside, wherein the groove (11) has an undercut (16) along its walls, and wherein the second connection geometry (B) has a groove (13) which is open toward the top, which is bordered by a lip (14) towards the outside and the groove (11) has an undercut (19) along its walls, wherein the shape and dimension of the first connection geometry (A) are complementary to the shape and dimension of the second connection geometry (B).

7. The floor board according to claim 6, characterized in that the lip (12) of the first connection geometry (A) and the lip (1.4) of the second connection geometry (B) are made at least in sections of a soft plastic, wherein the groove (11) of the first connection geometry (A) and the groove (13) of the second connection geometry (B) are made of a hard plastic.

8. The floor board according to claim 6, characterized in that the lip (12) of the first connection geometry (A) and the lip (14) of the second connection geometry (B) each have at least one slot (22) at least in sections.

9. A method for producing a floor board (10) according to claim 1, wherein in a first step the base plate (1) is produced, in a second step the sealing lip (9) with connection geometries (A, B) are formed on the side surfaces (3, 4, 5, 6) of the base plate (1) by means of injection molding technology, wherein the based plate (1) is placed in a cavity of an injection molding tool, wherein the cavity has the structures for sealing lip and the connection geometries, and the sealing lip (9) and the connection geometries are injected onto the base plate (1).

10. A method for producing a floor board (10) according to claim 9, wherein in a third step the top side (2a) of the base plate (1) is hydrophobized.

11. The floor board according to claim 5, characterized in that the at least one soft plastic has a Shore hardness A of 10 to 95 and the hard plastic a Shore hardness D of 10 to 95.

12. The floor board according to claim 5, characterized in that the at least one soft plastic is a thermoplastic elastomer and the at least one hard plastic is a thermoplastic.

13. The floor board according to claim 6, characterized in that the at least one soft plastic has, a Shore hardness A of 10 to 95 and the hard plastic a Shore hardness D of 10 to 95.

14. The floor board according to claim 6, characterized in that the at least one soft plastic is a thermoplastic elastomer and the at least one hard plastic is a thermoplastic.

* * * * *